April 10, 1956  H. J. METCALF  2,741,673
FLAT TIRE SIGNAL
Filed Oct. 16, 1953  2 Sheets-Sheet 1
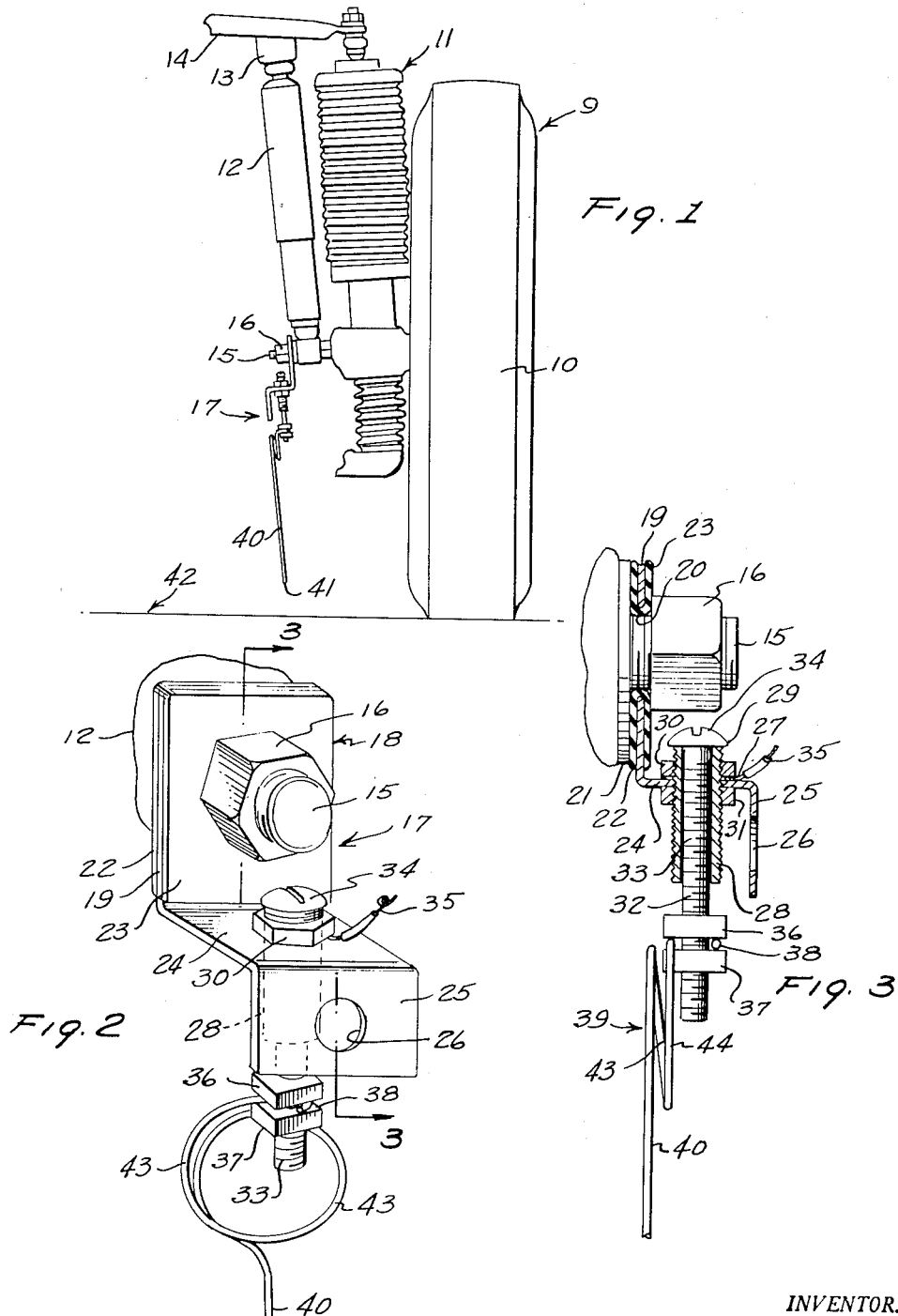
INVENTOR.
HOMER J. METCALF
BY
McMorrow, Berman + Davidson
ATTORNEYS April 10, 1956  H. J. METCALF  2,741,673
FLAT TIRE SIGNAL
Filed Oct. 16, 1953  2 Sheets-Sheet 2
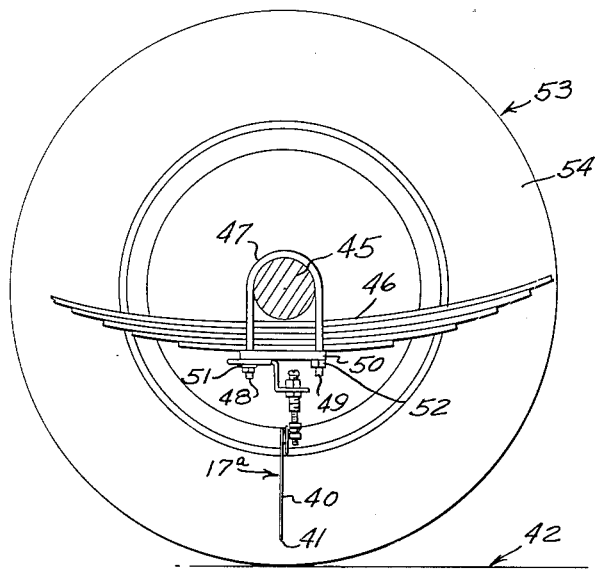
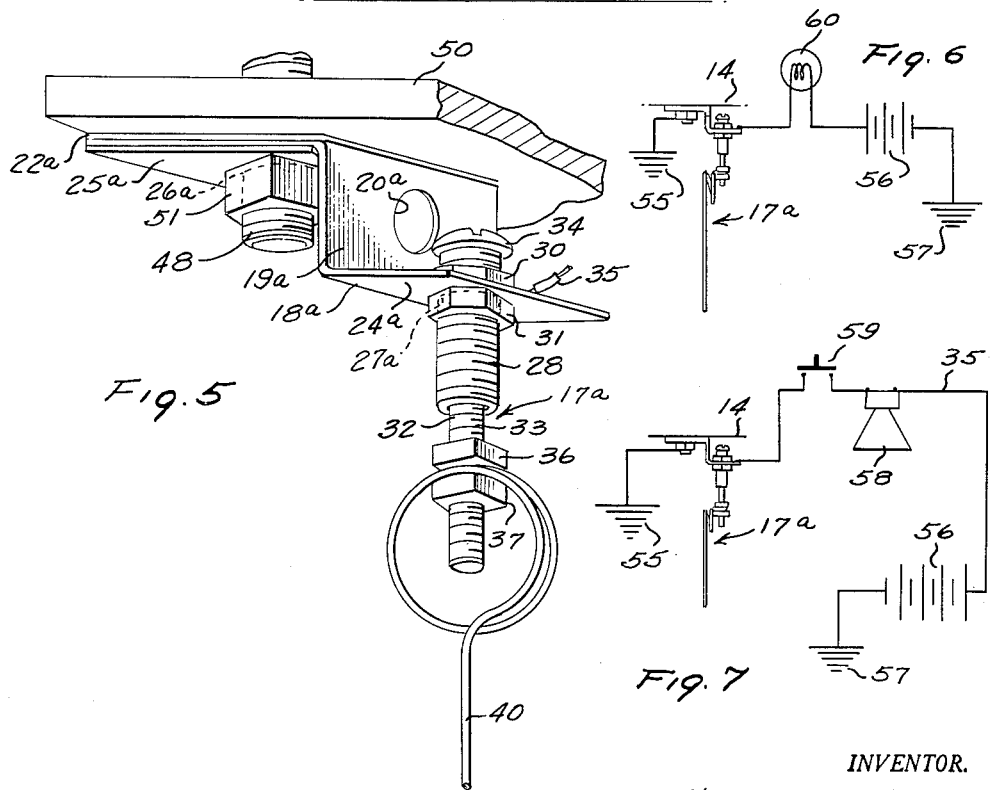
INVENTOR.
HOMER J. METCALF
BY
M. Morrow, Berman & Davidson
ATTORNEYS United States Patent Office 2,741,673
Patented Apr. 10, 1956

2,741,673

FLAT TIRE SIGNAL

Homer J. Metcalf, Hollydale, Calif.

Application October 16, 1953, Serial No. 386,429

5 Claims. (Cl. 200—61.24)

This invention relates to improvements in electrical tire deflection alarms, and more particularly to improved switches therefor, of the type which are closed by contact with the ground upon partial deflation of a tire and actuate a visual or sound alarm on a vehicle before the tire goes flat.

The primary object of this invention is to provide more efficient and practical switches of the character indicated above which are more reliable in action, are composed of a minimum number of simple parts, are easy to install and adjust, and are capable of being made in rugged and serviceable forms at relatively low cost.

Other important objects and advantageous features of the invention will be apparent from the following description and the accompanying drawings, wherein, for purposes of illustration rather than limitation, specific forms of the invention are set forth in detail.

In the drawings:

Figure 1 is a fragmentary front elevation showing a form of the invention applied to a vehicle front wheel suspension;

Figure 2 is a fragmentary enlarged perspective view of said form;

Figure 3 is a transverse vertical section taken on the line 3—3 of Figure 2;

Figure 4 is an inboard side elevation, partly in section, showing another form of the invention applied to a vehicle rear wheel suspension;

Figure 5 is an enlarged fragmentary perspective view of said other form;

Figure 6 is a wiring diagram showing a visual alarm circuit involving the invention; and Figure 7 is a wiring diagram showing an audible alarm circuit involving the invention.

Referring in detail to the drawings, wherein like numerals designate like parts throughout the several views, and first to Figures 1 to 3 thereof, there are therein shown a vehicle wheel 9 including the deflatable tire 10, where suspension means 11 including a shock absorber 12 having an upper end secured, as indicated at 13, to a part 14 of the vehicle frame (not shown) the lower end of the shock absorber 12 being secured to the suspension means 11 by a bolt 15 having a nut 16 thereon with a front tire alarm switch 17 in accordance with the invention mounted on the bolt 15 and secured in position by the nut 16.

The illustrated front wheel switch 17 comprises an angle bracket 18 comprising a vertical arm 19 having a hole 20 passing the bolt 15 and securable by the nut 16. The arm 19 can be of dielectric material, or of insulation coated metal, but is here shown as of bare metal, with a metal washer 21 on the bolt next to the shock absorber 12, an insulated washer 22 between the metal washer 21 and the arm 19 and another insulated washer 23 between the arm 19 and the nut 16, whereby the angle bracket 18 is insulated from the vehicle frame.

On the lower end of the arm 19 is the horizontal arm 24 of the angle bracket 18 which terminates at its end remote from the vertical arm 19 in a right angle depending flange 25 provided with a bolt hole 26.

The horizontal arm 24 is provided with a hole 27 through which is threaded part way a vertically adjustable threaded sleeve 28 having an upper end 29 located above the arm 24. Upper and lower adjusting nuts 30 and 31, respectively, are threaded on the sleeve 28 against the upper and lower sides, respectively, of the arm 24. Depending freely through the sleeve 28 is a contactor 32 which includes a threaded shank 33, and a contact head 34, which, when elevated into engagement with the nut 16, closes the associated alarm circuit, which includes the shock absorber 11 and the grounded vehicle frame part 14 and a wire 35 which is secured under the upper adjusting nut 30.

Upper and lower adjustable clamping nuts 36 and 37, respectively, are threaded on the contactor shank 33 at a point spaced below the lower end of the sleeve 28, and a loop 38 on the upper end of a spring metal ground engaging finger 39 is circumposed on the shank 33 and clamped between the nuts 36 and 37.

The ground engaging finger 39 is of heavy wire and comprises the straight perpendicular portion 40 whose lower end 41 is arranged for contact with the ground 42 upon deflation of the tire 10 and whose upper end is in the form of a coil composed of one and one-half convolutions 43 and 44, respectively, the half convolution 44 terminating in the loop 38. The convolutions of the coil are positioned in forward and rearward vertical planes, so that the finger 39 can be yieldably deflected, either forwardly or rearwardly when encountering an obstruction on the ground 42, and will be returned to perpendicular position after passing an obstruction.

Referring now to Figures 4 and 5 of the drawings, showing another form of the invention, there are therein shown a vehicle rear axle 45, a rear leaf spring 46 engaging the underside of the axle 45, a saddle 47 engaging over the axle 45 and having threaded lower ends 48, 49, traversing a plate 50 engaging the underside of the spring 46, on which are nuts 51 and 52, respectively, a rear wheel 53 being mounted on the axle 45 and having thereon a deflatable pneumatic tire 54, and a tire alarm switch 17a mounted on the saddle end 48 under the plate 50 and secured by the nut 51.

The tire alarm switch 17a comprises an angle bracket 18a generally similiar to the above described angle bracket 18, but being reversed in position with respect thereto. The angle bracket 18a includes the vertical arm 19a having therein the hole 20a, a horizontal arm 24a having the hole 27a therein, and the right angle flange 25a having the hole 26a therein. The saddle end 48 extends downwardly through the hole 26a in the flange 25a and the nut 51 on the end 48 clamps the flange 25a against the underside of the spring mounting plate 50, with an insulating plate 22a interposed therebetween.

The switch assembly of Figures 1 to 3 is mounted in the hole 27a of the horizontal arm 24a. An alarm circuit is closed upon elevation of the head 34 of the contactor 32 into contact with the spring mounting plate 50.

Figure 7 shows the tire alarm switch 17a connected between a chassis part 14, which is grounded, as indicated at 55, the wire 35 being connected to one side of a battery 56 whose other side is grounded to the chassis, as indicated at 57, a horn 58 being connected in the wire 35, and a switch 59, such as the ignition switch of the vehicle, being connected in the wire 35 between the tire alarm switch and the horn 58.

Figure 6 shows an electric bulb 60 susbstituted for the horn 58, and omits the switch 59.

The finger 30 is adjusted, by means of the nuts 36 and 37, so that the lower end 41 of the finger is about an inch above the ground 42. When the associated tire becomes low, the lower end 41 of the finger engages the ground 42 and is elevated thereby, so that the contactor head 34 of the contactor 32 is elevated into contact with the nut 16, in the case of the device of Figures 1 to 3, or with the plate 50, in the case of the device of Figures 4 and 5, thereby closing the associated above circuit and giving the driver of the vehicle either visual or audible warning of the low condition of the tire before the tire becomes dangerously flat.

What is claimed is:

1. In a flat tire alarm, a mounting bracket having a horizontal arm provided with a threaded hole, a vertical sleeve threaded through said hole, said sleeve having an upper end positioned above said arm and a lower end positioned below said arm, said sleeve having a smooth bore, a shank depending freely through said bore, said shank having an upper end, an enlarged diameter contact head on the upper end of the shank normally resting upon the upper end of the sleeve, said shank having a lower end normally disposed below the lower end of the sleeve, a depending ground-engaging finger having an upper end, and means securing the upper end of said finger to said shank at a point below the lower end of the sleeve.

2. In a flat tire alarm, a mounting bracket having a horizontal arm provided with a threaded hole, a vertical sleeve threaded through said hole, said sleeve having an upper end positioned above said arm and a lower end positioned below said arm, said sleeve having a smooth bore, a shank depending freely through said bore, said shank having an upper end, an enlarged diameter contact head on the upper end of the shank normally resting upon the upper end of the sleeve, said shank having a lower end normally disposed below the lower end of the sleeve, a depending ground-engaging finger having an upper end, and means securing the upper end of said finger to said shank at a point below the lower end of the sleeve, said sleeve being rotatable in the threaded hole in the bracket arm for vertical adjustment of the sleeve, and locking means acting between the sleeve and said arm for locking the sleeve in a selected vertical adjustment.

3. In a flat tire alarm, a mounting bracket having a horizontal arm provided with a threaded hole, a vertical sleeve threaded through said hole, said sleeve having an upper end positioned above said arm and a lower end positioned below said arm, said sleeve having a smooth bore, a shank depending freely through said bore, said shank having an upper end, an enlarged diameter contact head on the upper end of the shank normally resting upon the upper end of the sleeve, said shank having a lower end normally disposed below the lower end of the sleeve, a depending ground-engaging finger having an upper end, and means securing the upper end of said finger to said shank at a point below the lower end of the sleeve, said shank having a lower portion above its lower end, and said securing means being vertically adjustable along said lower portion of the shank.

4. In a flat tire alarm, a mounting bracket having a horizontal arm provided with a threaded hole, a vertical sleeve threaded through said hole, said sleeve having an upper end positioned above said arm and a lower end positioned below said arm, said sleeve having a smooth bore, a shank depending freely through said bore, said shank having an upper end, an enlarged diameter contact head on the upper end of the shank normally resting upon the upper end of the sleeve, said shank having a lower end normally disposed below the lower end of the sleeve, a depending ground-engaging finger having an upper end, and means securing the upper end of said finger to said shank at a point below the lower end of the sleeve, said sleeve being rotatable in the threaded hole in the bracket arm for vertical adjustment of the sleeve, and locking means acting between the sleeve and said arm for locking the sleeve in a selected vertical adjustment, said shank having a threaded lower portion, and said securing means comprising a pair of nuts threaded on said threaded lower portion for vertical adjustment along the shank and toward and away from each other, and a portion on the upper end of the finger clamped between said nuts.

5. In a flat tire alarm, a mounting bracket having a horizontal arm provided with a threaded hole, a vertical sleeve threaded through said hole, said sleeve having an upper end positioned above said arm and a lower end positioned below said arm, said sleeve having a smooth bore, a shank depending freely through said bore, said shank having an upper end, an enlarged diameter contact head on the upper end of the shank normally resting upon the upper end of the sleeve, said shank having a lower end normally disposed below the lower end of the sleeve, a depending ground-engaging finger having an upper end, and means securing the upper end of said finger to said shank at a point below the lower end of the sleeve, said sleeve being rotatable in the threaded hole in the bracket arm for vertical adjustment of the sleeve, and locking means acting between the sleeve and said arm for locking the sleeve in selected vertical adjustment, said locking means comprising lock nuts threaded on said sleeve and engaging opposite sides of said arm.

References Cited in the file of this patent

UNITED STATES PATENTS

| | | |
|---|---|---|
| 2,258,334 | Miller | Oct. 7, 1941 |
| 2,457,161 | Laidlaw | Dec. 28, 1948 |
| 2,568,610 | Chappell | Sept. 18, 1951 |
| 2,639,342 | Cope | May 19, 1953 |
| 2,640,119 | Bradford | May 26, 1953 |
| 2,673,261 | Sellards | Mar. 23, 1954 |